(12) United States Patent
Yan

(10) Patent No.: US 9,172,273 B2
(45) Date of Patent: Oct. 27, 2015

(54) SMOOTH SWITCHING DEVICE AND METHOD FOR DOUBLE POWER SUPPLIES

(75) Inventor: Chunrong Yan, Shenzhen (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 471 days.

(21) Appl. No.: 13/699,522

(22) PCT Filed: May 25, 2010

(86) PCT No.: PCT/CN2010/073208
§ 371 (c)(1),
(2), (4) Date: Nov. 21, 2012

(87) PCT Pub. No.: WO2011/147076
PCT Pub. Date: Dec. 1, 2011

(65) Prior Publication Data
US 2013/0062949 A1    Mar. 14, 2013

(51) Int. Cl.
*H02J 7/00* (2006.01)
*H02J 9/06* (2006.01)

(52) U.S. Cl.
CPC ............ *H02J 9/061* (2013.01); *H02J 2009/068* (2013.01); *Y10T 307/615* (2015.04)

(58) Field of Classification Search
CPC ........................................................ H02J 9/062
USPC ............................................................ 307/64
See application file for complete search history.

(56) References Cited

U.S. PATENT DOCUMENTS

| | | | | |
|---|---|---|---|---|
| 4,675,538 A * | 6/1987 | Epstein | ............................ | 307/64 |
| 6,104,104 A * | 8/2000 | Kuroki | ............................ | 307/66 |
| 6,107,698 A * | 8/2000 | Ochiai et al. | .................... | 307/43 |
| 6,140,801 A | 10/2000 | Aoki et al. | | |
| 6,483,730 B2 * | 11/2002 | Johnson, Jr. | .................. | 363/123 |
| 7,944,089 B2 * | 5/2011 | Lu et al. | ......................... | 307/66 |
| 8,049,364 B2 * | 11/2011 | Shakespeare et al. | .......... | 307/64 |
| 2005/0083016 A1 | 4/2005 | Yau et al. | | |

FOREIGN PATENT DOCUMENTS

| | | |
|---|---|---|
| CN | 2485854 | 4/2002 |
| CN | 1505238 A | 6/2004 |
| CN | 1627593 | 6/2005 |
| CN | 101013824 | 8/2007 |
| CN | 101447691 A | 6/2009 |
| CN | 201378752 Y | 1/2010 |
| JP | 01-110027 | 4/1989 |
| WO | WO 02/09255 A1 | 1/2002 |

OTHER PUBLICATIONS

International Search Report mailed Feb. 24, 2011 from corresponding International Application No. PCT/CN2010/073208.

* cited by examiner

*Primary Examiner* — Stephen W Jackson
(74) *Attorney, Agent, or Firm* — Wolf, Greenfield & Sacks, P.C.

(57) ABSTRACT

A smooth switching device and method for double power supplies. The devices includes a main/backup power supply switching unit (1), a relay control unit (3), a charge management unit (2), a main power supply switching auxiliary unit (4) and a backup power supply switching auxiliary unit (5). The device and the method enable the main power supply (200) and the backup power supply (300) which supply power for electric equipment (100) to be switched smoothly, so that it is not easy for the electric equipment (100) to be disconnected with the power supplies and the fluctuation of a load voltage is small. Moreover, the device doesn't need a bulk capacitor used for auxiliary switching and doesn't need to be used together with a radiator.

14 Claims, 4 Drawing Sheets

SMOOTH SWITCHING DEVICE AND METHOD FOR DOUBLE POWER SUPPLIES

FIELD OF THE INVENTION

The present invention relates to the technical field of a switching between double power supplies, and in particular to a device and method for smoothly switching between double power supplies.

BACKGROUND OF THE INVENTION

With rapid development of information technique, the requirement for the power supply system increases. For some important electric equipment, such as communication equipment, if the power supply of the power supply system is suddenly interrupted, it is easy to lose some important data, and the normal operation of other relevant systems may even be affected, so as to bring a serious consequence. Thus, in order to avoid the above cases, besides a commercial power as a main power supply, other equipment such as a battery group is used as a backup power supply for some important electric equipment. Therefore, a certain requirement is proposed for the switch between the main/backup power supplies.

In the prior art, there are mainly three switch solutions described below.

The first solution: a power supply switch between the main/backup power supplies is implemented by switching a movable contact of the relay between a first movable contact and a second movable contact and connecting a bulk capacitor to the load side, as specifically shown in FIG. 1. In this way, a smooth switch between the main/backup power supplies is implemented, and an energy storage function of the backup power supply is fully exerted. However, there are some disadvantages as following.

1. There is a large fluctuation of the voltage of the load, and the switch between the main/backup power supplies will cause some phenomenon such as the powerdown when the voltage of the backup power supply is low.

2. The capacitor is charged rapidly at the moment when connecting with the power supply system, such that the circuits in front of the capacitor are easily to be damaged. Therefore, the bulk capacitor is easy to introduce a hidden danger in the circuit and the cost is increased. However, the main/backup power supplies cannot be switched smoothly without the bulk capacitor storing the energy.

The second solution: a diode is used to implement the power supply switch between the main/backup power supplies, as specifically shown in FIG. 2. In this way, a smooth switch between the main/backup power supplies can be implemented without a bulk capacitor for performing an auxiliary switch. However, there are some disadvantages as following.

1. A large voltage drop will be generated at the PN junction of the diode when a large current flows through the diode, and thus the energy storage function of the backup power supply cannot be fully exerted.

2. A large amount of power consumption will be generated at the diode, and thus the reliability of the operation of the circuit will be ensured by a radiator used for heat dissipation. Meanwhile, a largely increased temperature will cause a performance degradation of devices around the diode and be adverse to miniaturize the product.

3. Since there is no over discharging protection function, the backup power supply still supplies power to the load even when the electric quantity thereof is not sufficient, such that the service life of the battery is decreased.

The third solution: a transistor is used to implement the power supply switch between the main/backup power supplies, as specifically shown in FIG. 3. Due to the short turn-on time of the transistor, a smooth switch between the main/backup power supplies is implemented. Moreover, the voltage drop of the transistor can be adjusted to be low, so the energy storage function of the backup power supply can be fully exerted. Meanwhile, a bulk capacitor is not needed for the auxiliary switch. However, there are some disadvantages as following.

1. The backup power supply is charged directly by the main power supply when a short circuit is caused due to a failure of one of the transistor Q1 and the transistor Q2, which will shorten the service life of the backup power supply and may cause the backup power supply bomb.

2. A large amount of power consumption will be generated at the transistors, and thus a radiator has to be used also. Meanwhile, a too high temperature will cause a performance degradation of devices around the transistor and be adverse to miniaturize the product.

SUMMARY OF THE INVENTION

The technical problem to be solved by the present invention is to provide a device and method for smoothly switching between double power supplies in order to avoid the above defects in the prior art such as the easy occurrence of the powerdown, the large fluctuation of the voltage of the load, a bulk capacitor which is needed for auxiliary switching and a radiator which has to be used together.

One technical solution of the present invention for solving the technical problem is to construct a device for smoothly switching between double power supplies, which is used for providing a smooth switch between a main power supply and a backup power supply which supply power to an electric equipment, the device includes:

a main/backup power supply switching unit for switching between the main power supply and the backup power supply by switching a stationary contact of a relay in the main/backup power supply switching unit between a first movable contact and a second movable contact;

a relay control unit for detecting output voltages of the main power supply and the backup power supply, and controlling the switch of the stationary contact of the relay in the main/backup power supply switching unit between the first movable contact and the second movable contact according the detected result;

a charging management unit for detecting the output voltage of the backup power supply, and controlling the main power supply to charge the backup power supply when the output voltage of the backup power supply is lower than a preset charging threshold;

a main power supply switching auxiliary unit for providing a continuous current to the electric equipment during the switch of the stationary contact to the first movable contact of the relay, wherein the main power supply switching auxiliary unit is connected between the main power supply and the electric equipment;

a backup power supply switching auxiliary unit for providing a continuous current to the electric equipment during the switch of the stationary contact to the second movable contact of the relay, and disconnecting the backup power supply when the main power supply is disconnected and the output voltage of the backup power supply is lower than a preset over discharging threshold, wherein the backup power supply switching auxiliary unit is connected between the backup power supply and the electric equipment.

The device for smoothly switching between double power supplies according to the present invention further includes:

an operation indication unit for indicating operation states of the main power supply and the backup power supply.

In the device for smoothly switching between double power supplies according to the present invention, the charging management unit includes a voltage detection module for detecting the output voltage of the backup power supply, a threshold setting module for setting the charging threshold and the over discharging threshold, a charging module for controlling the main power supply to charge the backup power supply when the output voltage of the backup power supply is lower than the charging threshold, and a signal generation module for generating an over discharging signal of the backup power supply when the output voltage of the backup power supply is lower than the over discharging threshold.

In the device for smoothly switching between double power supplies according to the present invention, the main power supply switching auxiliary unit includes a first diode component which is turned on to provide the continuous current to the electric equipment by the main power supply during the switch of the stationary contact to the first moving contact of the relay.

The first diode component includes a schottky diode or several schottky diodes connected in parallel, the anode of the schottky diode is connected with the main power supply, and the cathode of the schottky diode is connected with the electric equipment.

In the device for smoothly switching between double power supplies according to the present invention, the backup power supply switching auxiliary unit includes a second diode component and a P-type metal oxide semiconductor field effect transistor, the second diode component includes a schottky diode or several schottky diodes connected in parallel, the anode of the schottky diode is connected to the drain of the P-type metal oxide semiconductor field effect transistor, the source of the P-type metal oxide semiconductor field effect transistor is connected to the backup power supply, the gate of the P-type metal oxide semiconductor field effect transistor is connected to the relay control unit.

The relay control unit controls the P-type metal oxide semiconductor field effect transistor to be turned on to provide the continuous current to the electric equipment by the backup power supply during the switch of the stationary contact to the second movable contact of the relay; and controls the P-type metal oxide semiconductor filed effect transistor to be turned off when the over discharging signal of the backup power supply is detected, so as to disconnect the backup power supply.

A second technical solution for solving the technical problem according to the present invention is to construct a method for smoothly switching between double power supplies, the method includes the following steps:

controlling a switch of a stationary contact of a relay between a first movable contact and a second movable contact according to a detected result of output voltages of a main power supply and a backup power supply, so as to switch between the main power supply and the backup power supply;

charging the backup power supply by the main power supply when the output voltage of the backup power supply is lower than a preset charging threshold according to the detected result of the output voltage of the backup power supply;

providing a continuous current to an electric equipment during the switch of the stationary contact to the first movable contact of the relay; and providing a continuous current to the electric equipment during the switch of the stationary contact to the second movable contact of the relay, and disconnecting the backup power supply when the main power supply is disconnected and the output voltage of the backup power supply is lower than a preset over discharging threshold.

The method for smoothly switching between double power supplies according to the present invention further includes the following step:

indicating operation states of the main power supply and the backup power supply.

The method for smoothly switching between double power supplies according to the present invention further includes: a sub-step of voltage detection for detecting the output voltage of the backup power supply, a sub-step of threshold setting for setting the charging threshold and the over discharging threshold, a sub-step of charging for charging the backup power supply by the main power supply when the output voltage of the backup power supply is lower than the charging threshold, and a sub-step of signal generation for generating a over discharging signal of the backup power supply when the output voltage of the backup power supply is lower than the over discharging threshold.

In the method for smoothly switching between double power supplies according to the present invention, during the switch of the stationary contact to the first movable contact of the relay, the main power supply is electrically connected to the electric equipment by turning on the first diode component, so as to provide the continuous current to the electric equipment;

the first diode component includes a schottky diode or several schottky diodes connected in parallel, the anode of the schottky diode is connected with the main power supply, and the cathode of the schottky diode is connected with the electric equipment.

In the method for smoothly switching between double power supplies according to the present invention, during the switch of the stationary contact to the second movable contact of the relay, the backup power supply provides the continuous current to the electric equipment by controlling the serial structure of the second diode component and a P-type metal oxide semiconductor field effect transistor to be turned on; and when the over discharging signal of the backup power supply is detected, the P-type metal oxide semiconductor field effect transistor is turned off, so as to disconnect the backup power supply;

the second diode component includes a schottky diode or several schottky diodes connected in parallel, the anode of the schottky diode is connected to the drain of the P-type metal oxide semiconductor field effect transistor, the source of the P-type metal oxide semiconductor field effect transistor is connected to the backup power supply, the P-type metal oxide semiconductor field effect transistor is turned on or off according to the over discharging signal of the backup power supply.

The device and method for smoothly switching between double power supplies have the following advantages.

First, during the switch of the stationary contact of the relay in the main/backup power supply switching unit 1 between the first movable contact and the second movable contact, the main power supply switching auxiliary unit and the backup power supply switching auxiliary unit provide the continuous current to the electric equipment, and thus the switch between the main/backup power supplies will not cause phenomena such as powerdown.

Second, the backup power supply switching auxiliary unit cuts off the backup power supply when the main power supply is cut off and the output voltage of the backup power supply is lower than the over discharging threshold, so as to prevent the backup power supply from being over discharged and protect the backup power supply.

Third, in the main power supply switching auxiliary unit and the backup power supply switching auxiliary unit, instead of the heat dissipation of the radiator, the schottky diode is used to provide the continuous current, the energy storage function of the backup power supply can be fully exerted and the product can be miniaturized.

Fourth, since the switch of the contact of the relay has a delay property, a serial structure of the schottky diode and the P-type metal oxide semiconductor field effect transistor is used in the backup power supply switching auxiliary unit, so as to ensure the P-type metal oxide semiconductor field effect transistor to be turned off during the switch of the stationary contact to the second movable contact of the relay. Thus, the backup power supply is effectively cut off and an effective switch between the contacts of the relay is ensured.

Fifth, the bulk capacitor is not used, so as to avoid a hidden danger of the circuit and decrease the cost.

Sixth, the main power supply will not directly charge the backup power supply in the case of a failure of some devices, so as to avoid the explosion of the backup power supply.

BRIEF DESCRIPTION OF THE DRAWINGS

The invention will be further described in conjunction with drawings and embodiments, in the drawings.

DETAILED DESCRIPTION OF THE INVENTION

Figure 1:
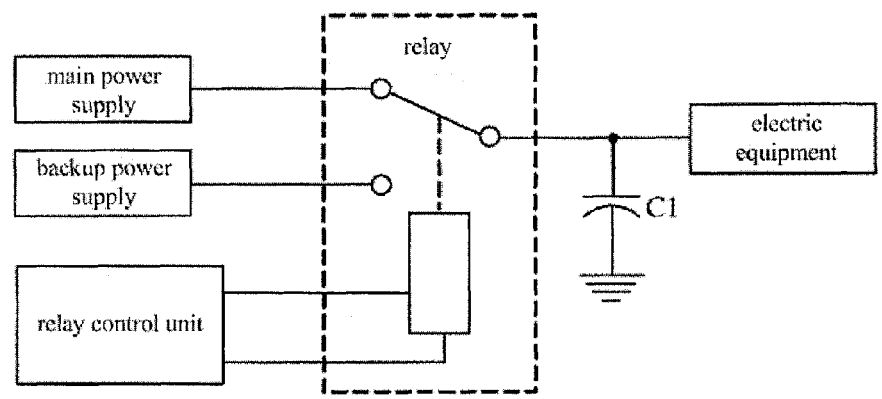
FIG. 1 is a schematic diagram of a first switching solution in the prior art.
Figure 2:
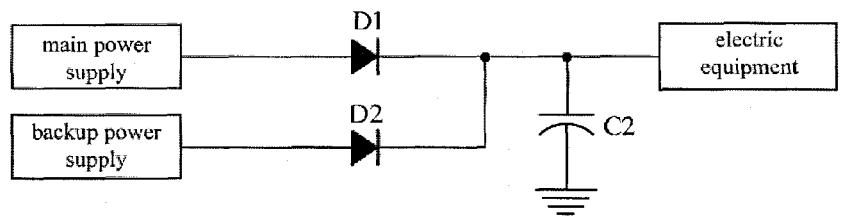
FIG. 2 is a schematic diagram of a second switching solution in the prior art.
Figure 3:
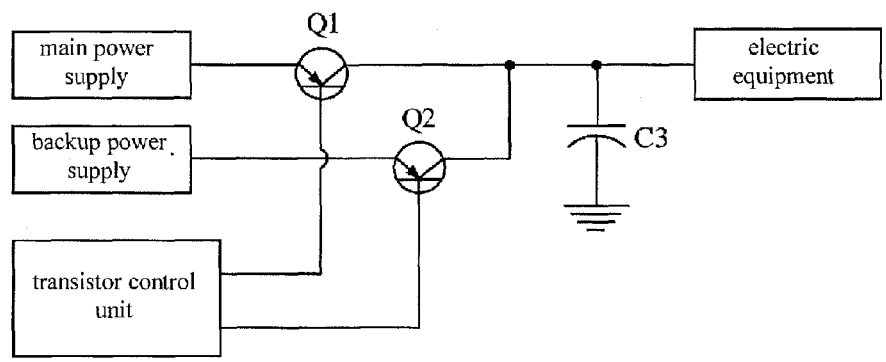
FIG. 3 is a schematic diagram of a third switching solution in the prior art.
Figure 4:
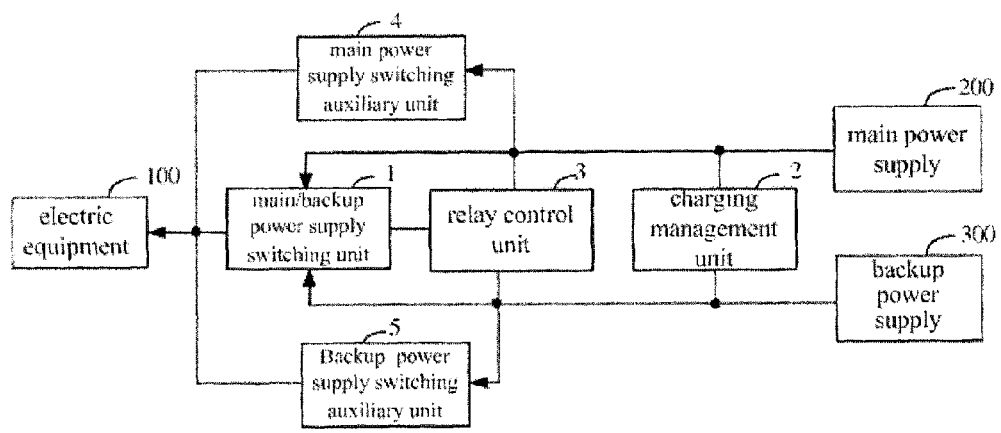
FIG. 4 is a structure diagram of a first embodiment of a device for smoothly switching between double power supplies according to the present invention.

In FIG. 4, a structure diagram of a first embodiment of a device for smoothly switching between double power supplies according to the present invention is shown. The device for smoothly switching between double power supplies smoothly switches between the main power supply 200 and the backup power supply 300 which provide power to the electric equipment 100. The device includes a main/backup power supply switching unit 1, a charging management unit 2, a relay control unit 3, a main power supply switching auxiliary unit 4 and a backup power supply switching auxiliary unit.

Particularly, the main/backup power supply switching unit 1 switches between the main power supply 200 and the backup power supply 300 by switching the stationary contact of the relay in the main/backup power supply switching unit 1 between the first movable contact and the second movable contact. The charging management unit 2 detects the output voltage of the backup power supply 300 and controls the main power supply 200 to charge the backup power supply 300 when the output voltage of the backup power supply 300 is lower than a charging threshold. The relay control unit 3 is adapted to detect the output voltages of the main power supply 200 and the backup power supply 300 and control the switch of the stationary contact of the relay between the first movable contract and the second movable contact according to the detected result. The main power supply switching auxiliary unit 4 provides the continuous current to the electric equipment 100 during the switch of the stationary contact to the first movable contact of the relay. The backup power supply switching auxiliary unit 5 provides the continuous current to the electric equipment 100 during the switch of the stationary contact to the second movable contact of the relay and disconnects the backup power supply 300 when the main power supply is disconnected and the output voltage of the backup power supply 300 is lower than the over discharging threshold.

Specifically, the relay control unit 3 detects the output voltages of the main power supply 200 and the backup power supply 300 in real time. There are two instances. In the first instance, when the output voltage of the main power supply 200 is abnormal, the relay control unit 3 controls the switch of the relay, that is, the switch of the stationary contact of the relay to the second movable contact, so as to provide the power to the electric equipment 100 by the backup power supply 300. During the switch, the backup power supply 300 provides the continuous current to the electric equipment by the backup power supply switching auxiliary unit 5. Moreover, the backup power supply 300 is disconnected by the backup power supply switching auxiliary unit 5 when the main power supply 200 is disconnected and the output voltage of the backup power supply 300 is lower than a preset over discharging threshold. In the second instance, when the output voltage of the backup power supply 300 is abnormal, the relay control unit 3 controls the switch of the relay, that is, the switch of the stationary contact of the relay to the first movable contact, so as to provide the power to the electric equipment 100 by the main power supply 200. During the switch, the main power supply 200 provides the continuous current to the electric equipment by the main power supply switching auxiliary unit 4. In this way, the device for smoothly switching between double power supplies according to the present invention ensures the switch between the main power supply 200 and the backup power supply 300 and avoids some phenomenon such as powerdown.

Figure 5:
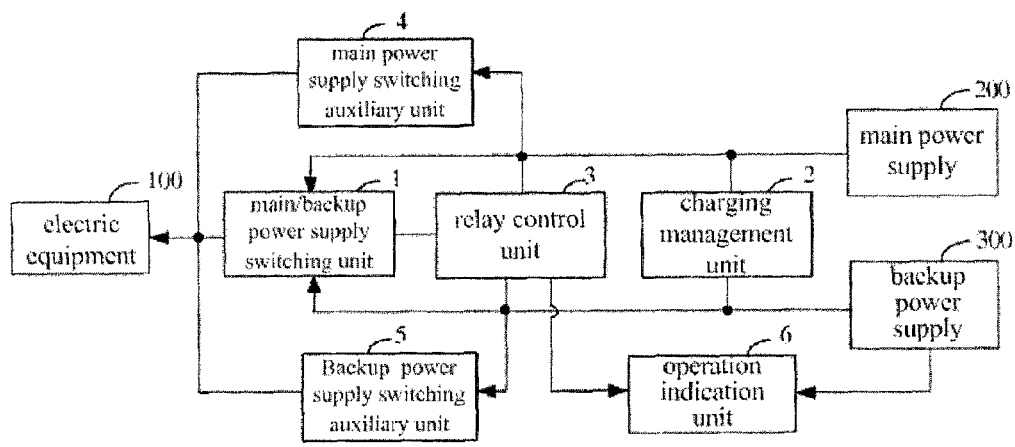
FIG. 5 is a structure diagram of a second embodiment of a device for smoothly switching between double power supplies according to the present invention.

In FIG. 5, a structure diagram of a second embodiment of a device for smoothly switching between double power supplies according to the present invention is shown. The second embodiment is different from the first embodiment shown in FIG. 4 in that: an operation indication unit 6 for indicating the operation states of the main power supply 200 and the backup power supply 300 is added. In the present invention, the backup power supply 300 supplies the power to the operation indication unit 6, so as to ensure that the operation indication unit 6 can always operate during the failure of the main power supply 200.

In the present invention, the operation indication unit 6 is an indication light or a display for indicating the operation states of the main power supply 200 and the backup power supply 300. When the indication light is used, the operation states of the main power supply 200 and the backup power supply 300 may be indicated respectively by different colors of light emitted from the indication light; or several indication lights can be provided to indicate the operation states of the main power supply 200 and the backup power supply 300. When the display is used, the operation states of the main power supply 200 and the backup power supply 300 may be indicated by controlling the display window.

Figure 6:
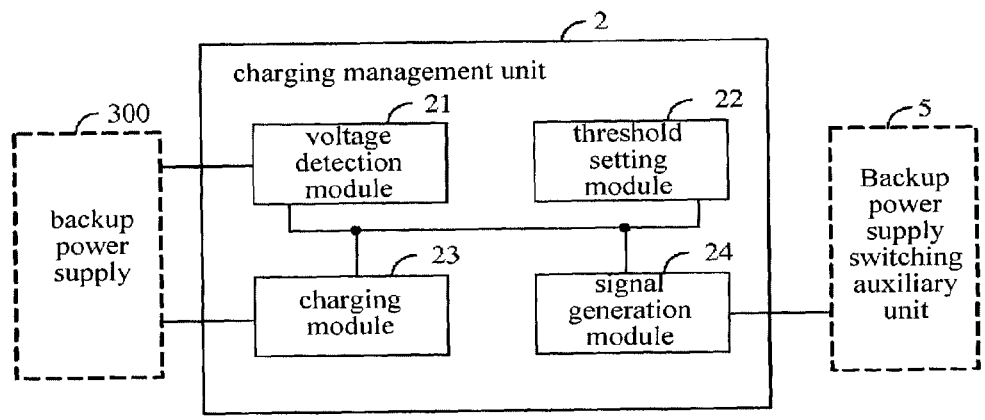
FIG. 6 is a structure diagram of a charging management unit according to the present invention.

In FIG. 6, a structure diagram of a charging management unit according to the present invention is shown. The charging management unit 2 includes a voltage detection module 21 for detecting the output voltage of the backup power supply 300, a threshold setting module 22 for setting the charging threshold and the over discharging threshold, a charging module 23 for controlling the main power supply 200 to charge the backup power supply 300 when the output voltage of the backup power supply 300 is lower than the charging threshold, and a signal generation module 24 for generating the over discharging signal of the backup power supply when the output voltage of the backup power supply 300 is lower than the over discharging threshold.

Figure 7:
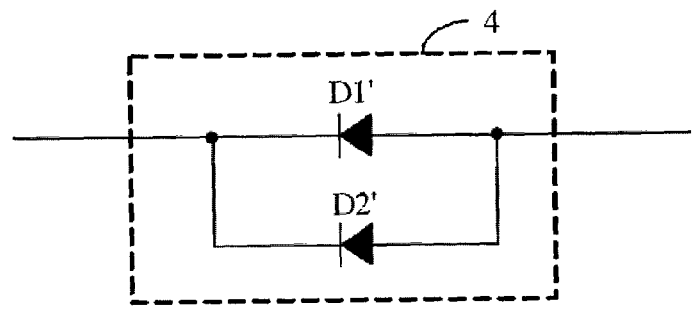
FIG. 7 is a circuit diagram of an embodiment of a main power supply switching auxiliary unit according to the present invention.

FIG. 7 shows a circuit diagram of an embodiment of the main power supply switching auxiliary unit according to the present invention. In conjunction with FIG. 4 or FIG. 5, the main power supply switching auxiliary unit 4 is connected between the main power supply 200 and the electric equipment 100; and includes a first diode component, the first diode component which turns on during the switching of the stationary contact to the first movable contact of the relay, so as to provide the continuous current to the electric equipment 100 by the main power supply 200. In the embodiment, the first diode component includes two schottky diodes connected in parallel, the anodes of the schottky diodes are connected with the main power supply 200, the cathodes of the schottky diodes are connected with the electric equipment 100. In other embodiment, the first diode component may be one schottky diode or several schottky diodes connected in parallel.

Figure 8:
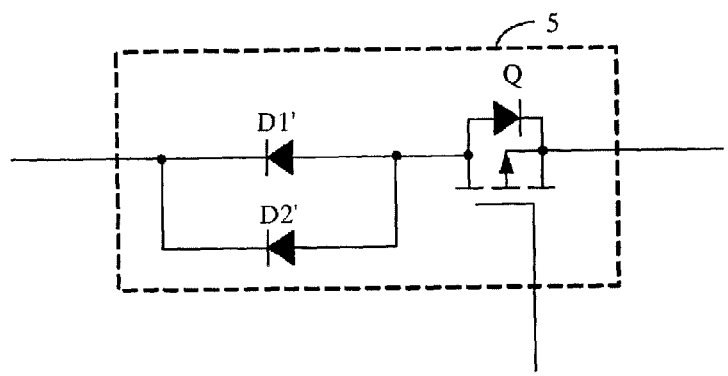
FIG. 8 is a circuit diagram of an embodiment of a backup power supply switching auxiliary unit according to the present invention.

In FIG. 8, a circuit diagram of an embodiment of the backup power supply switching auxiliary unit according to the present invention is shown. In conjunction with FIG. 4 or FIG. 5, the backup power supply auxiliary unit 5 is connected between the backup power supply 300 and the electric equipment 100; and includes a second diode component and a P-type metal oxide semiconductor field effect diode. The second diode component includes a schottky diode or several schottky diodes connected in parallel, the anode of the schottky diode is connected to the drain of the P-type metal oxide semiconductor field effect transistor, the source of the P-type metal oxide semiconductor field effect transistor is connected to the backup power supply 300, and the gate of the P-type metal oxide semiconductor field effect transistor is connected to the relay control unit 3.

The relay control unit 3 controls the P-type metal oxide semiconductor field effect transistor to be turned on during the switch of the stationary contact to the second movable contact of the relay so as to provide the continuous current to the electric equipment 100 by the backup power supply 300, and controls the P-type metal oxide semiconductor field effect transistor to be turned off when the over discharging signal of the backup power supply is detected so as to disconnect the backup power supply 300.

The method of generating the over discharging signal of the backup power supply includes: generating the over discharging signal of the backup power supply by the signal generation module of the charging management unit 2 when the output voltage of the backup power supply 300 is lower than the charging threshold.

In the present invention, a small-capacitance filter capacitor is connected in parallel with the electric equipment, functions as the filter and the voltage stabilization, so as to effectively reduce the ripple.

Figure 9:
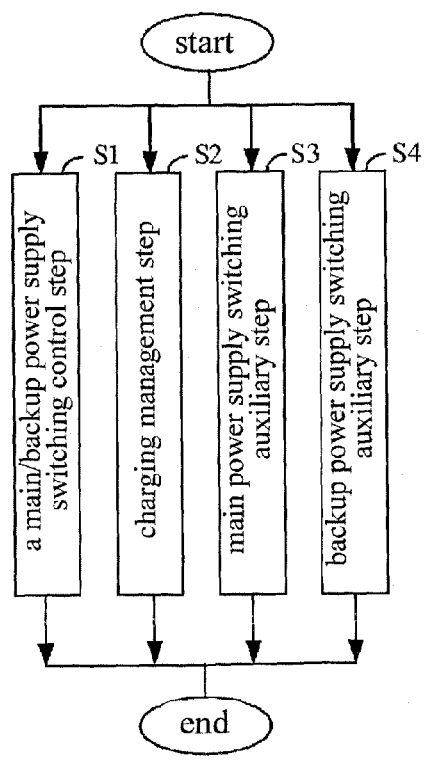
FIG. 9 is a flow chart of a first embodiment of a method for smoothly switching between double power supplies according to the present invention.

In FIG. 9, a flow chart of a first embodiment of the method for smoothly switching between double power supplies according to the present invention is shown. The method for smoothly switching between double power supplies includes the following steps.

Step S1, a main/backup power supply switching control step. The switch of the stationary contact of the relay between the first movable contact and the second movable contact is controlled according to the detected result of the output voltages of the main power supply and the backup power supply, so as to implement the switch between the main power supply and the backup power supply.

Step S2, a charging management step. The backup power supply is charged by the main power supply when the output voltage of the backup power supply is lower than the charging threshold according to the detected result of the output voltage of the backup power supply. The step S2 includes a sub-step of voltage detection for detecting the output voltage of the backup power supply, a sub-step of threshold setting for setting the charging threshold and the over discharging threshold, a sub-step of charging for controlling the main power supply to charge the backup power supply when the output voltage of the backup power supply is lower than the charging threshold, and a sub-step of signal generation for generating the over discharging signal of the backup power supply when the output voltage of the backup power supply is lower than the over discharging threshold.

Step S3, a main power supply switching auxiliary step. The continuous current is provided for the electric equipment during the switch of the stationary contact to the first movable contact of the relay. In the step S3, during the switch of the stationary contact to the first movable contact of the relay, the main power supply is electrically connected with the electric equipment by turning on the first diode component, so as to provide the continuous current to the electric equipment. The first diode component includes a schottky diode or several schottky diodes connected in parallel, the anode of the schottky diode is connected with the main power supply, and the cathode of the schottky diode is connected with the electric equipment.

Step S4, a backup power supply switching auxiliary step. The continuous current is provided to the electric equipment during the switch of the stationary contact to the second movable contact of the relay, and the backup power supply is disconnected when the main power supply is disconnected and the output voltage of the backup power supply is lower than the over discharging threshold. In the step S4, the backup power supply provide the continuous current to the electric equipment by controlling the serial structure of the second diode component and the P-type metal oxide semiconductor field effect transistor conductive to be turned on during the switch of the stationary contact to the second movable contact of the relay, and the P-type metal oxide semiconductor field effect transistor is controlled to be turned off, so as to disconnect the backup power supply cut off, when the over discharging signal of the backup power supply is detected. The second diode component includes a schottky diode or several schottky diodes connected in parallel, the anode of the diode is connected to the drain of the P-type metal oxide semiconductor field effect transistor, the source of the P-type metal oxide semiconductor field effect transistor is connected to the backup power supply, and the P-type metal oxide semiconductor field effect transistor turns on or turns off according to the over discharging signal of the backup power supply.

Figure 10:
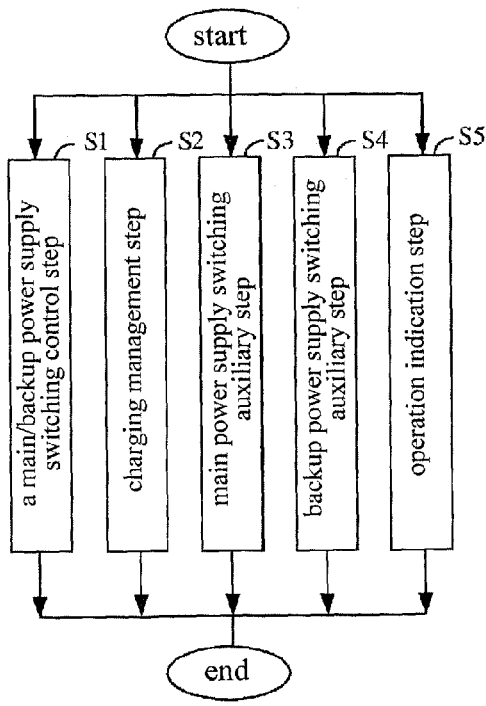
FIG. 10 is a flow chart of a second embodiment of a method for smoothly switching between double power supplies according to the present invention.

In FIG. 10, a flow chart of a second embodiment of the method for smoothly switching between double power supplies according to the present invention is shown. The second embodiment is different from the first embodiment shown in FIG. 9 in that: a step S5 of operation indication for indicating the operation states of the main power supply and the backup power supply is added. In the indication step S5, the operation states of the main power supply and the backup power supply are indicated by an indication light or a display, the users can know whether the main power supply or the backup power supply provides power at that moment, and even can know the stored electric quantity of the backup power supply at that moment.

In the present invention, the indication light or the display can be adapted to indicate the operation states of the main power supply and the backup power supply. When the indication light is used, the operation states of the main power supply and the backup power supply are indicated respectively by different colors of light emitted from the indication light, or the operation states of the main power supply and the backup power supply are indicated respectively by several indication lights. When the display is used, the operation states of the main power supply and the backup power supply are indicated by controlling the display window.

In the present invention, the switch of the stationary contact to the first movable contact of the relay refers to that the stationary contact is switched from the second movable contact to the first movable contact of the relay. During this switch, the stationary contact is separated from the second contact and not yet in contact with the first contact. Similarly, the switching of the stationary contact to the second movable contact of the relay refers to that the stationary contact is switched from the first movable contact to the second movable contact of the relay. During this switch, the stationary contact is separated from the first contact and not yet in contact with the second contact.

The above are merely embodiments of the present invention, and not intent to limit the present invention; any modifications, equivalent substitutes or improvements in the spirit and principle of the present invention are all included in the protection scope of the present invention.

The invention claimed is:

1. A device for smoothly switching between double power supplies, which is used for providing a smooth switch between a main power supply and a backup power supply which supply power to electric equipment, wherein the device comprises:
   a main/backup power supply switching unit for switching between the main power supply and the backup power supply by a switch of a stationary contact of a relay in the main/backup power supply switching unit between a first movable contact and a second movable contact;
   a relay control unit for detecting output voltages of the main power supply and the backup power supply, and controlling the switch of the stationary contact of the relay between the first movable contact and the second movable contact according to a detected result;
   a charging management unit for detecting the output voltage of the backup power supply, and controlling the main power supply to charge the backup power supply when the output voltage of the backup power supply is lower than a preset charging threshold;
   a main power supply switching auxiliary unit for providing a continuous current to the electric equipment during the switch of the stationary contact to the first movable contact of the relay, wherein the main power supply switching auxiliary unit is connected between the main power supply and the electric equipment;
   a backup power supply switching auxiliary unit for providing a continuous current to the electric equipment during the switch of the stationary contact to the second movable contact of the relay, and disconnecting the backup power supply when the main power supply is disconnected and the output voltage of the backup power supply is lower than a preset over discharging threshold, wherein the backup power supply switching auxiliary unit is connected between the backup power supply and the electric equipment.

2. The device for smoothly switching between double power supplies according to claim 1, further comprising:
   an operation indication unit for indicating operation states of the main power supply and the backup power supply.

3. The device for smoothly switching between double power supplies according to claim 1, wherein the charging management unit comprises:
   a voltage detection module for detecting the output voltage of the backup power supply;
   a threshold setting module for setting the charging threshold and the over discharging threshold;
   a charging module for controlling the main power supply to charge the backup power supply when the output voltage of the backup power supply is lower than the charging threshold; and
   a signal generation module for generating an over discharging signal of the backup power supply when the output voltage of the backup power supply is lower than the over discharging threshold.

4. The device for smoothly switching between double power supplies according to claim 1, wherein the main power supply switching auxiliary unit comprises a first diode component which is turned on to provide the continuous current to the electric equipment by the main power supply during a switch of the stationary contact to the first movable contact of the relay; and
   the first diode component comprises a schottky diode or several schottky diodes connected in parallel, the anode of the schottky diode is connected with the main power supply, and the cathode of the schottky diode is connected with the electric equipment.

5. The device for smoothly switching between double power supplies according to claim 3, wherein the backup power supply switching auxiliary unit comprises a second diode component and a P-type metal oxide semiconductor field effect transistor, the second diode component comprises a schottky diode or several schottky diodes connected in parallel, the anode of the schottky diode is connected to the drain of the P-type metal oxide semiconductor field effect transistor, the source of the P-type metal oxide semiconductor field effect transistor is connected to the backup power supply, the gate of the P-type metal oxide semiconductor field effect transistor is connected to the relay control unit; and
   the relay control unit controls the P-type metal oxide semiconductor field effect transistor to be turned on to provide the continuous current to the electric equipment by the backup power supply during a switch of the stationary contact to a second movable contact of the relay; and controls the P-type metal oxide semiconductor field effect transistor to be turned off when the over discharging signal of the backup power supply is detected, so as to disconnect the backup power supply.

6. A method for smoothly switching between double power supplies, comprising:
controlling a switch of a stationary contact of a relay between a first movable contact and a second movable contact according to a detected result of output voltages of a main power supply and a backup power supply, so as to switch between the main power supply and the backup power supply;
charging the backup power supply by the main power supply when the output voltage of the backup power supply is lower than a preset charging threshold according to the detected result of the output voltage of the backup power supply;
providing a continuous current to an electric equipment during the switch of the stationary contact to the first movable contact of the relay; and
providing a continuous current to the electric equipment during the switch of the stationary contact to the second contact of the relay, and disconnecting the backup power supply when the main power supply is disconnected and the output voltage of the backup power supply is lower than a preset over discharging threshold.

7. The method for smoothly switching between double power supplies according to claim 6, further comprising:
indicating operation states of the main power supply and the backup power supply.

8. The method for smoothly switching between double power supplies according to claim 6, further comprising:
a sub-step of voltage detection for detecting the output voltage of the backup power supply;
a sub-step of threshold setting for setting the charging threshold and the over discharging threshold;
a sub-step of charging for controlling the main power supply to charge the backup power supply when the output voltage of the backup power supply is lower than the charging threshold; and
a sub-step of signal generation for generating an over discharging signal of the backup power supply when the output voltage of the backup power supply is lower than the over discharging threshold.

9. The method for smoothly switching between double power supplies according to claim 6, wherein during the switch of the stationary contact to the first movable contact of the rely, the main power supply is electrically connected to the electric equipment by turning on the first diode component, so as to provide the continuous current to the electric equipment; and
the first diode component comprises a schottky diode or several schottky diodes connected in parallel, the anode of the schottky diode is connected with the main power supply, and the cathode of the schottky diode is connected with the electric equipment.

10. The method for smoothly switching between double power supplies according to claim 8, wherein during the switch of the stationary contact to the second movable contact of the relay, the backup power supply provides the continuous current to the electric equipment during the switching of the stationary contact to the second movable contact of the relay by controlling the serial structure of a second diode component and a P-type metal oxide semiconductor field effect transistor to be turned on; and when the over discharging signal of the backup power supply is detected, the P-type metal oxide semiconductor field effect transistor is turned off, so as to disconnect the backup power supply, wherein the second diode component comprises a schottky diode or several schottky diodes connected in parallel, the anode of the schottky diode is connected to the drain of the P-type metal oxide semiconductor field effect transistor, the source of the P-type metal oxide semiconductor field effect transistor is connected to the backup power supply, the P-type metal oxide semiconductor field effect transistor is turned on or off according to the over discharging signal of the backup power supply.

11. The device for smoothly switching between double power supplies according to claim 2, wherein the charging management unit comprises:
a voltage detection module for detecting the output voltage of the backup power supply;
a threshold setting module for setting the charging threshold and the over discharging threshold;
a charging module for controlling the main power supply to charge the backup power supply when the output voltage of the backup power supply is lower than the charging threshold; and
a signal generation module for generating an over discharging signal of the backup power supply when the output voltage of the backup power supply is lower than the over discharging threshold.

12. The device for smoothly switching between double power supplies according to claim 2, wherein the main power supply switching auxiliary unit comprises a first diode component which is turned on to provide the continuous current to the electric equipment by the main power supply during a switch of the stationary contact to the first movable contact of the relay; and
the first diode component comprises a schottky diode or several schottky diodes connected in parallel, the anode of the schottky diode is connected with the main power supply, and the cathode of the schottky diode is connected with the electric equipment.

13. The method for smoothly switching between double power supplies according to claim 7, further comprising:
a sub-step of voltage detection for detecting the output voltage of the backup power supply;
a sub-step of threshold setting for setting the charging threshold and the over discharging threshold;
a sub-step of charging for controlling the main power supply to charge the backup power supply when the output voltage of the backup power supply is lower than the charging threshold; and
a sub-step of signal generation for generating an over discharging signal of the backup power supply when the output voltage of the backup power supply is lower than the over discharging threshold.

14. The method for smoothly switching between double power supplies according to claim 7, wherein during the switch of the stationary contact to the first movable contact of the rely, the main power supply is electrically connected to the electric equipment by turning on the first diode component, so as to provide the continuous current to the electric equipment; and
the first diode component comprises a schottky diode or several schottky diodes connected in parallel, the anode of the schottky diode is connected with the main power supply, and the cathode of the schottky diode is connected with the electric equipment.

* * * * *